Figure 1:
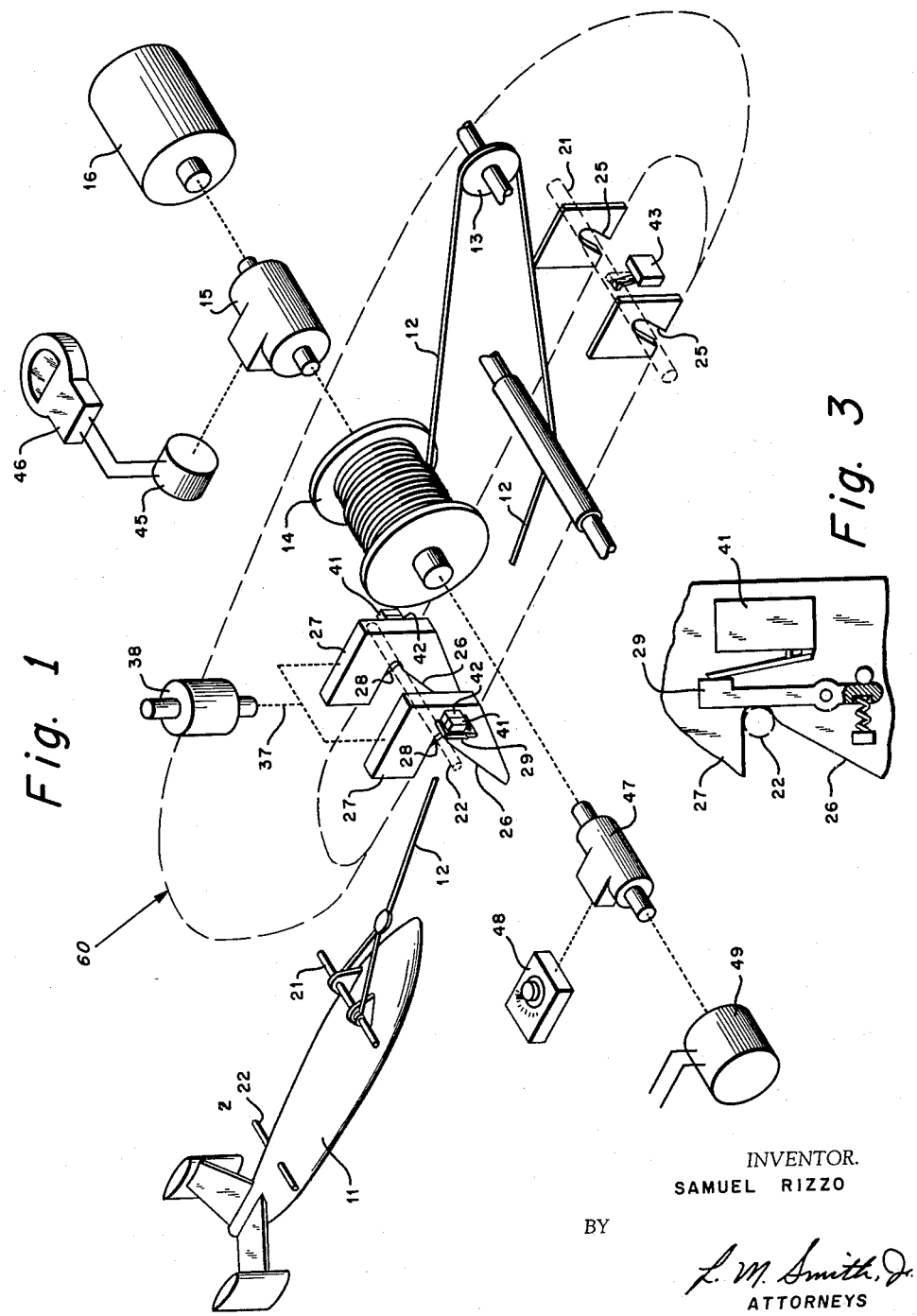

July 11, 1961 S. RIZZO 2,991,959
ELECTRO-MECHANICAL WINCH CONTROL SYSTEM
Filed May 13, 1958 2 Sheets-Sheet 1

INVENTOR.
SAMUEL RIZZO
BY
ATTORNEYS

July 11, 1961 S. RIZZO 2,991,959
ELECTRO-MECHANICAL WINCH CONTROL SYSTEM
Filed May 13, 1958 2 Sheets-Sheet 2

INVENTOR.
SAMUEL RIZZO
BY
*L. M. Smith, Jr.*
ATTORNEYS

# United States Patent Office 2,991,959
Patented July 11, 1961

1

2,991,959
ELECTRO-MECHANICAL WINCH CONTROL SYSTEM
Samuel Rizzo, Philadelphia, Pa., assignor to the United States of America as represented by the Secretary of the Navy
Filed May 13, 1958, Ser. No. 735,075
3 Claims. (Cl. 244—3)
(Granted under Title 35, U.S. Code (1952), sec. 266)

The invention described herein may be manufactured and used by or for the Government of the United States of America for governmental purposes without the payment of any royalties thereon or therefor.

This invention relates to an electro-mechanical winch control system, and more particularly to an electro-mechanical winch control system remotely controlled to launch, tow, and retrieve a nose towed capsule suspended from an aircraft.

The installation originally designed and built to launch, tow and retrieve a nose towed capsule of the type described in U.S. Patent No. 2,779,553 to Harold M. Troxell for Nose Towed Capsule, was composed of relatively complex mechanical linkages operated hydraulically and controlled electrically, an inherently bulky arrangement which was relatively large and heavy and hence difficult to install in an aircraft. A later development comprised a substantially smaller and lighter assembly in which a relatively simplified mechanical linkage was controlled and operated electrically. This latter assembly is described in detail in co-pending application Serial No. 436,261 of Harold M. Troxell et al. for Automatic Retrieving Mechanism for Nose Towed Bird filed June 11, 1954, now U.S. Patent No. 2,848,179 as including a first pair of primary latches directly regulated by the electrical control system and a second pair of secondary latches mechanically linked to and positioned by the first pair of latches.

While the control system assembly disclosed in the U.S. Patent 2,848,179 reduced the size, weight and complexity of the mechanism required as compared to the original installation, the instant invention contemplates further reduction in the weight of the control system and substantial additional simplification of the mechanical components of the system and the electrical controls therefor. More particularly the instant invention contemplates the provision of a compact relatively simple winch mechanism comprising a relatively limited number of parts automatically operable to adjustably support an object attached to the end of flexible supporting means such as a cable, said mechanism being selectively energized to position such an object alternatively in an extended or retracted position and to move it safely between these positions. Accordingly, this device includes a first circuit effective when energized to drive a cable storage means to move an object supported by such a cable to a stowed position, a reliable latch mechanism for maintaining such an object in a stowed position, and a second circuit effective when energized to drive a flexible cable stowing means in the opposite direction to place an object supported thereby in an extended position, said second circuit also including means for releasing the latch mechanism when said second circuit is energized.

An object of this invention is the provision of simple, compact, reliable means for launching, towing, and retrieving an object connected to the end of flexible supporting means.

Another object is to provide automatically operable means for initiating launching and retrieving operations and for terminating such operations to position an object connected to the end of a flexible cable alternatively in either an extended or retracted position, as desired.

Still another object is the provision of multiple concurrently operable latching means for securing an adjustably positioned object attached to a flexible supporting cable in a stowed position when the supporting cable is retracted, independent of the support provided by the cable.

A final object of this invention is to provide means for indicating whether or not an object supported and adjustably positioned by a flexible supporting cable is in fact fully secured in a stowed position by multiple concurrently operable latching means.

Figure 2:
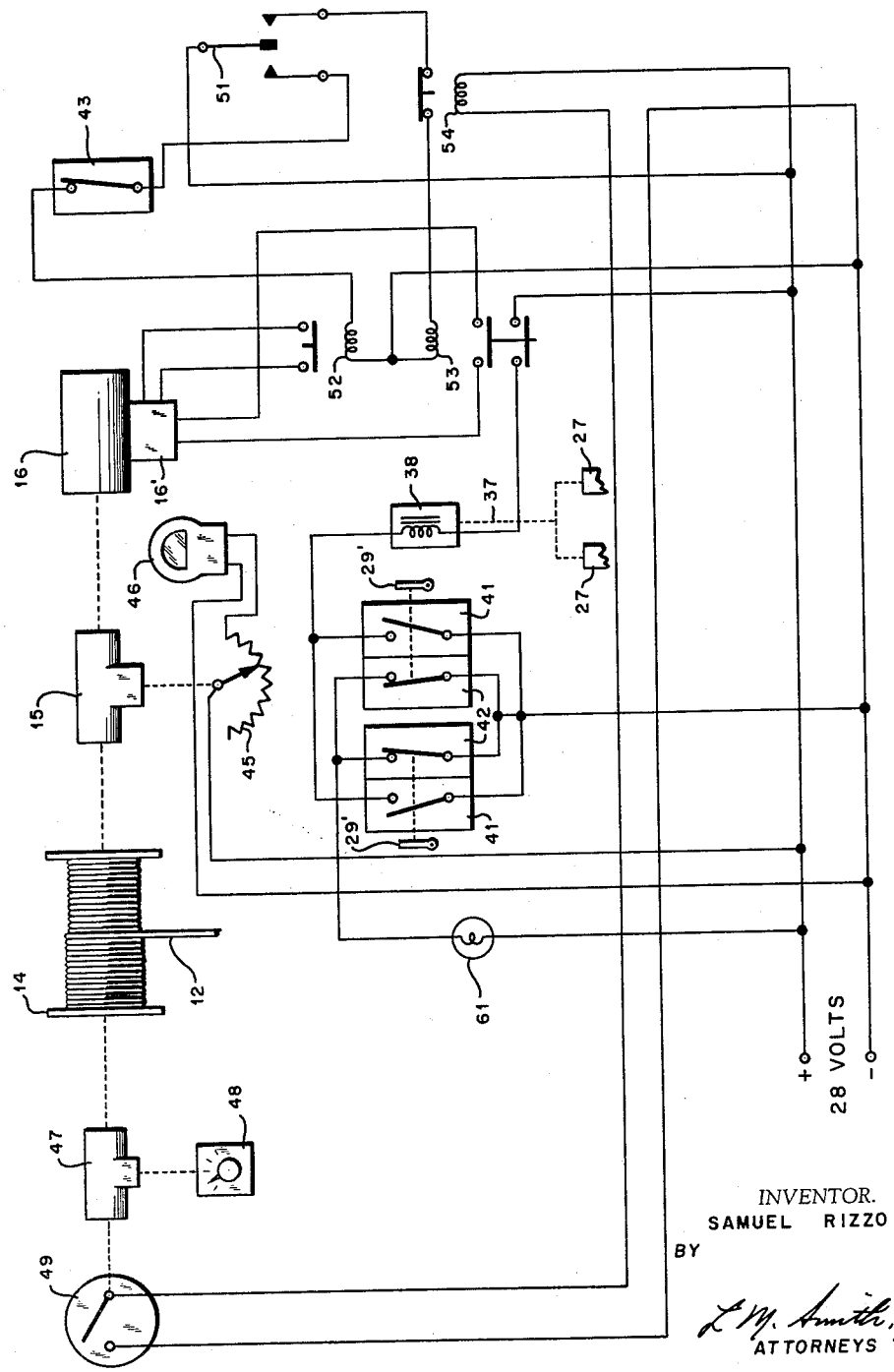

Other objects and many of the attendant advantages of this invention will be readily appreciated as the same becomes better understood by reference to the following detailed description when considered in connection with the accompanying drawings wherein:

FIG. 1 is an isometric expanded schematized representation of a preferred embodiment of the instant invention illustrating the relationship between the principal electromechanical components of the instant invention, FIG. 2 is a diagrammatic representation of the respective electrical circuits included in the instant invention illustrated in relation to schematic representations of the several electro-mechanical components of the instant invention controlled thereby, and FIG. 3 is a broken-away side elevation of a portion of the device illustrated in FIG. 1 showing certain structural details thereof.

Referring now to the drawings wherein like reference numerals refer to corresponding parts of the instant invention as illustrated in the several views, FIG. 1 shows a schematic representation of the preferred embodiment of the instant invention illustrated in operative relationship to an object 11 such as a nose towed capsule to be adjustably positioned thereby, while FIG. 2 illustrates the respective circuits automatically operable in response to selective displacement of a manual control switch to launch or retrieve an object 11 supported by the flexible cable 12.

The construction of the device comprising the instant invention will be described primarily with reference to the showing in FIG. 1 of an arrangement for launching, towing and retrieving a capsule 11 by means of a cable 12 passed over a pulley 13 and wound on a cable storage reel 14 arranged to be driven in either direction by the reversible drive motor 16 in response to a suitable impulse. As the cable 12 is wound upon the reel 14 the capsule 11 is positioned in its retracted or stowed position in which the forward attachment means of the capsule, cross bar 21 extending transversely of the capsule 11, is disposed in the position therefor indicated in dotted lines in FIG. 1, in which this cross bar is seated in the forwardly disposed pair of slots 25 comprising the forward capsule engaging means of this device. Concurrently, the rear attachment means of the capsule, cross bar 22 extending transversely of the capsule 11, is disposed in the position therefor indicated in dotted lines in FIG. 1, in which this cross bar is seated at the upper ends of elongated camming surfaces 26 comprising the rearward capsule engaging means of this device. With the cross bar 22 disposed as indicated by dotted lines in FIG. 1, the retaining means 28 of the respective latch assemblies 27 secure the cross bar 22 and hence the capsule 11 in its retracted or stowed position until these assemblies are released simultaneously at the initiation of the launching or streaming operation by actuation of the solenoid assembly 38 connected through the mechanical linkage 37 to the respective latch assemblies 27 disposed as shown in side by side relationship. The detailed features of the latch assemblies 27 including the retaining means 28 are not described herein nor are latch assemblies 27 illustrated in detail in the accompanying drawings since latch assemblies suitable for this purpose are described in detail in the co-pending application Serial No. 735,074, filed May 13, 1958, of John L. Felix for Latch Mechanism, now U.S. Patent 2,931,231.

In addition, FIG. 1 serves to illustrate the disposition or operative relationship of various elements of the instant invention to coacting components of this device. For example, the switch assemblies 41, 42 and 43, the potentiometer 45 mechanically coupled to the reducing gear 15, and the variable speed gear box 47, the gear box control 48, and the rotary switch assembly 49 mechanically connected to the gear box 47, all shown schematically in FIG. 1 in operative relationship to the other elements with which they are associated, will be described in greater detail below in the description of the operation of the instant invention including a description of the electrical circuits by means of which these various elements are operatively interconnected. It should be noted that the schematic showing in FIG. 1 is a simplified representation showing the several elements in expanded relationship to each other to facilitate a clear showing of the interrelationship of the various elements of this device. However, in practice, it is anticipated that all of these elements will be arranged and interconnected in such a manner that they may be enclosed within a relatively compact framework not illustrated covered by or comprising a faired shell represented in FIG. 1 by the dotted outline generally designated by the reference numeral 60.

The operation of this device will be described primarily with reference to the showing in FIG. 2 which includes schematic representations of numerous elements also illustrated in FIG. 1, shown in operative relation to the circuitry by means of which the operation of the respective elements is controlled. Starting with the capsule 11 streamed behind the device of the instant invention in its extended position at the end of the length of flexible cable 12, as shown in FIG. 1, the "cable in" circuit may be activated by moving the manually operated switch 51 to the left as shown in FIG. 2. This displacement of switch 51 completes a circuit from the 28 volt power source through the normally closed switch 43 to the relay 52 which operates to close a circuit including the motor control 16′ of the reversible drive motor 16 which will energize the motor 16 to produce rotation transmitted through the speed reduction gear box 15 to reel 14 in a direction which will wind the cable 12 upon the storage reel 14 of the winch assembly until the forward cross bar 21 of the capsule 11 is seated in the slots 25 so that it engages and opens the normally closed switch assembly 43 to deenergize the relay 52 and thereby terminate operation of the drive motor 16. Meanwhile, the rear cross bar 22 of the capsule 11 will have been brought into engagement with the camming surfaces 26 of the latch assemblies 27 and will have traveled upwardly along these forwardly sloped surfaces until it reaches the position indicated in FIG. 1 by the dotted outline of the cross bar 22. As the cross bar 22 reaches the seat therefor at the upper end of each of the camming surfaces 26, as indicated by the dotted line representation in FIG. 3, it mechanically trips and locks the retaining means 28 of each latch assembly 27 independently to secure one end of the cross bar 22 and thereby retain the capsule in its fixed stowed or retracted position adjacent to the device of the instant invention. With the cross bar 22 of the capsule 11 seated in the position indicated by dotted lines in FIG. 1, it will have displaced the common actuator 29 engaging each pair of switches 42 and 41 mounted on each latch assembly 27, resulting in closing the normally open switch 41 and concurrently in opening the normally closed switch 42. See FIG. 3 for a clear showing of this relationship. If both ends of the cross bar 22 are properly seated in and secured by the respective latch assemblies 27, both normally closed switches 42 connected in parallel are opened and the warning light 61 is deenergized, indicating that the capsule 11 is properly secured in its stowed or retracted position. If either or both of the normally open switches 41 are closed by operation of the cross bar 22 as it is secured in either latch assembly 27, the circuit including the solenoid assembly 38 is completed to the relay 53.

When the operator wishes to stream the capsule 11 to place it in its extended position by unreeling the cable 12 from the storage reel 14, the switch 51 is moved to the right, as shown in FIG. 2 to the "cable out" position in which the relay 53 is energized through the normally closed contacts of relay 54 to complete a circuit through one pair of contacts controlled by relay 53 which includes a reversing circuit in the motor control 16′ which will energize the drive motor 16 for rotation in the opposite direction transmitted through the speed reduction gear box 15 to the reel 14 to pay out the cable 12 from the storage reel 14. Since the relay 53 operates to close two pairs of contacts, the closing of the second pair of contacts concurrently energizes the circuit including the solenoid assembly 38 so that displacement of the armature of the solenoid assembly 38 connected to the linkage 37 is effected to move the linkage 37 to simultaneously release the retaining means 28 of the respective latch assemblies 27 and thereby disengage these assemblies from the cross bar 22 secured thereby. Thereafter, rotation of the reel assembly 14 in response to operation of the motor 16 continues until the desired length of cable 12 is unwound therefrom. When the desired cable length is reached the rotary switch 49 connected through the variable gear box 47 to the reel 14 for rotation therewith will be closed to energize the relay 54 and open the normally closed contacts controlled by relay 54 to deenergize the "cable out" circuit. The desired cable length may be preselected by manual operation of the control 48 coupled to the variable gear gox 47 and preferably calibrated to read directly in cable length. In addition, the variable resistance 45 mechanically connected to the speed reducing gear box 15 may be connected to a suitably calibrated metering means such as a voltmeter 46, which may be calibrated to indicate the number of feet of cable which is extended at any given instant. Moreover, while the automatic cut-off switches normally terminate the reeling operation in either operation at the desired terminal point, either operation may be terminated at any point at the discretion of the operator by releasing the switch 51 so that it returns to its central position as illustrated in FIG. 2, and the other operation may be initiated by moving the switch 51 in the opposite direction to initiate that operation.

Finally, it should be noted that if only one of the normally closed switches 42 is opened by engagement of one end of the cross bar 22 with one common actuator 29, shown best in FIG. 3, the warning light 61 remains energized by the closed switch 42 connected in parallel with the open switch 42 to indicate that the capsule 11 is not properly secured in both latch assemblies 27. Under this condition, the normally open switch 41 paired with the switch 42 which is opened by an actuator 29 will be closed by the same actuator 29 so that movement of the control switch 51 to the "cable out" position will energize the solenoid assembly 38 through the closed switch 41 and release the capsule 11 from the single latch assembly 27 which is engaged with the bar 22. Thereafter, the operator may reenergize the "cable in" circuit to properly secure the cross bar 22 by engagement with the retaining means 28 of both latch assemblies 27.

While the structural details of the resversible drive motor 16 and the motor control 16′ have not been disclosed since such devices are conventional and well-known in the art, it is to be understood that drive motor 16 may conveniently be operatively connected to storage reel 14 through means including a combined clutch and brake assembly coordinated through motor control 16′ with energization and deenergization of the respective control circuits illustrated in FIG. 2. The clutch may be arranged to be engaged whenever the motor is energized and disengaged whenever the motor is deenergized. While the cooperating brake assembly may be arranged to be released whenever the clutch is engaged and to be applied whenever the clutch is disengaged, all in the manner described in the U.S. Patent 2,848,179.

Thus, this device provides a simplified control system for streaming and retrieving a capsule towed by an aircraft selectively positioned in a retracted or an extended position, which device includes means for providing a positive indication of failure of either of a pair of latch assemblies to engage and secure the cross bar mounted upon the towed capsule, and also includes means providing a positively acting means for releasing and reengaging both latch assemblies in the event that either fails to operate to retain a capsule in its stowed position due to transient adverse aerodynamic forces acting upon the capsule as it is drawn into engagement with the respective latch assemblies.

Obviously many modifications and variations of the present invention are possible in the light of the above teachings. It is therefore to be understood that within the scope of the appended claims the invention may be practiced otherwise than as specifically described.

What is claimed is:

1. A winch control system in a vehicle operable to selectively position an elongated object freely supported at the end of a flexible cable in an extended position remote from the vehicle and in a fixed retracted position adjacent to the vehicle, comprising: a generally elongated housing, storage reel means for a flexible cable, reversible drive motor means for said storage reel means, first motor control switch means manually closable for causing said reversible drive motor means to unwind the cable on said storage reel means, rotary switch means driven by said reversible drive motor means and causing the circuit closed by the closing of said first motor control switch means to open when the object secured to the cable reaches the extended position, variable speed transmission means connecting said rotary switch means with said reversible drive motor means and having control means for permitting the length of extended cable to be controlled by changing the gear ratio of said variable speed transmission, first and second elongated camming surfaces fixedly spaced in tandem along the housing for supporting the elongated object at correspondingly spaced first and second mating cross bars thereon in the retracted position adjacent to the housing, a latching assembly fixed in the housing at said first surface for securing the first cross bar in a fixed retracted position relative to said camming surfaces, said latching assembly being automatically and independently operable to engage the first cross bar when in the retracted position, second motor control switch means manually closed for causing said reversible drive motor means to wind the cable on said storage reel means and position the object in the retracted position, automatically operable switch means fixed in the housing at said second surface causing the circuit closed by the closing of said second motor control switch means to open when the second cross bar reaches the retracted position, signal light means, solenoid operated means including solenoid means for unlatching said latching assembly, a first switch means fixed at said first surface and electrically connected to energize said signal light means when the first cross bar is moved from the retracted position and to deenergize said signal light means when the first cross bar is in the retracted position, a second switch means fixed at said first surface and electrically connected to energize said solenoid means when said first motor control switch means are closed and thereby simultaneously freeing the first cross bar when said storage reel means are driven by said reversible driving motor means in a direction to permit the object to move to the extended position.

2. A winch control system in a vehicle operable to selectively position an object freely supported at the end of a flexible cable in an extended position remote from the vehicle and a fixed retracted position adjacent to the vehicle, comprising: a housing, storage reel means for flexible cable, reversible drive motor means for said storage reel means, first manually closable motor control switch means causing said reversible drive motor means to unwind the cable on said storage reel means, first and second socket means fixedly spaced longitudinally along the housing for securing the object at correspondingly spaced first and second bars thereon, in a fixed retracted position, said first and second socket means being automatically and independently operable to engage the first and second cross bars, respectively, when in the retracted position, second manually closed motor control switch means causing said reversible drive motor means to wind the cable on said storage reel means and position the first and second cross bars in the retracted position, automatically operable switch means fixed in the housing at said second socket means causing the circuit closed by the closing of said second motor control switch means to open when the second cross bar reaches the retracted position, solenoid operated means including solenoid means for latching and unlatching said first socket means, a first switch means fixed at said first socket means and electrically connected to energize said solenoid means when said first motor control switch means are closed and thereby simultaneously freeing the first cross bar when said storage reel means are driven in a direction by said reversible driving motor means to permit the object to move to the extended position.

3. A winch control system as set forth in claim 1 wherein said first camming surface comprises a pair of laterally spaced projections, said first switch means comprises a contact on each of said projections electrically connected in parallel, and said second switch means comprises a contact on each of said projections electrically connected in parallel.

References Cited in the file of this patent

UNITED STATES PATENTS

| | | |
|---|---|---|
| 2,751,167 | Hopper et al. | June 19, 1956 |
| 2,848,179 | Troxell et al. | Aug. 19, 1958 |